United States Patent
Schuster et al.

[11] Patent Number: 5,854,343
[45] Date of Patent: Dec. 29, 1998

[54] CONTINUOUS PROCESS FOR PREPARING STORAGE-STABLE ORGANOPOLYSILOXANE COMPOSITIONS

[75] Inventors: Johann Schuster, Emmerting; Helmut Wöhrl, Aetötting, both of Germany; Johann Mersch, Ach, Austria; Horst Müller, Emmerting; Peter Webeck, Marktl, both of Germany

[73] Assignee: Wacker-Chemie GmbH, Munich, Germany

[21] Appl. No.: 811,096

[22] Filed: Mar. 3, 1997

[30] Foreign Application Priority Data

May 2, 1996 [DE] Germany ............ 196 17 606.9

[51] Int. Cl.⁶ .................. C08K 3/00; C08G 77/00
[52] U.S. Cl. ................ 524/847; 528/12; 528/39; 106/287.1; 106/287.16; 106/287.34
[58] Field of Search ................ 524/847; 528/12, 528/39; 106/287.1, 287.16, 287.34

[56] References Cited

U.S. PATENT DOCUMENTS

| | | | |
|---|---|---|---|
| 4,208,316 | 6/1980 | Nauroth et al. | 260/37 |
| 4,737,561 | 4/1988 | Stary et al. | 106/2 |
| 4,757,080 | 7/1988 | Wanninger | 425/203 |
| 5,057,151 | 10/1991 | Schuster et al. | 528/14 |
| 5,591,797 | 1/1997 | Barthel et al. | 524/493 |

FOREIGN PATENT DOCUMENTS

| | | |
|---|---|---|
| 7625691 | 12/1991 | Australia . |
| 0258159 | 3/1988 | European Pat. Off. . |
| 0649885 | 4/1995 | European Pat. Off. . |
| 3243954 | 5/1984 | Germany . |
| 4005823 | 8/1997 | Germany . |
| WO92/13694 | 8/1992 | WIPO . |

OTHER PUBLICATIONS

English Derwent Abstract for DE4005823.

*Primary Examiner*—Randy Gulakowski
*Attorney, Agent, or Firm*—Brooks & Kushman

[57] ABSTRACT

The organopolysiloxane compositions are prepared by
(1) organopolysiloxanes, and
(2) prehydrophobicized oxidic stiffening fillers being blended and kneaded in a kneading machine 1 having at least two kneading chambers 2 which are arranged in series next to one another, each contain two axially parallel kneading tools 3 drivable so as to corotate or counterrotate, and communicate with one another via openings 5 through which passage is possible transversely to the axes 4 of the kneading tools 3, the first kneading chamber 2 having a charging port 6 and the final kneading chamber 2 having a discharge port 7.

20 Claims, 1 Drawing Sheet

CONTINUOUS PROCESS FOR PREPARING STORAGE-STABLE ORGANOPOLYSILOXANE COMPOSITIONS

BACKGROUND OF THE INVENTION

Compositions comprising organopolysiloxanes and hydrophobic oxidizing reinforcing fillers must be kneaded intensively to achieve uniform dispersion of the filler, to improve the storage stability of the compositions and to obtain good mechanical characteristics of the vulcanized silicone rubbers produced from the compositions.

A process for the continuous preparation of silicone compositions which can be condensation-crosslinked at room temperature, using fumed silicic acid, have been described in U.S. Pat. No. 4,737,561. There the components of the silicone compositions are first combined in an enclosed continuous mixer and then, in an oscillating reciprocating compounder admixed with catalyst, homogenized and devolatilized.

AU-A-91 76 256 describes a process for the continuous preparation of matrices for addition-crosslinkable silicone compositions. In a twin-screw extruder, polydimethylsiloxane having terminal vinyl groups, hydrophilic fumed silicic acid, water and hexamethyldisilazane are mixed. In the process, the hydrophilic silicic acid is hydrophobicized by water and hexamethyldisilazane. Hydrophobicization therefore takes place in situ.

The above-described screw reactors, i.e. oscillating reciprocating compounder and twin-screw extruder do not permit sufficiently intensive kneading of the silicone compositions, since the insufficiently long residence time of the compositions in the reactor chamber can be varied only to a minor extent. Even if the throughput is reduced, the residence time hardly changes, since the screws have a constant delivery. If the rotational speed is reduced, it is possible to slightly extend the residence time, but this is offset by less effective kneading.

Additionally, the process described in AU-A-91 76 256 has the drawback of high emissions which occur on any kneading machine and are consequently not readily kept under control. Furthermore, systematic control of the hydrophobicization is virtually impossible, nor is it possible any longer to correct the filler contents of the compositions, since suitable fillers are lacking.

A process for the prehydrophobicization of oxidic reinforcing fillers is described in U.S. Pat. No. 5,057,151. There the hydrophilic filler is hydrophobicized in an excess of hydrophobicizing agent while being subjected to mechanical stress. Subsequently, excess hydrophobicizing agent is drawn off and recycled into the process.

During prehydrophobicization of the filler it is possible for the degree of hydrophobicization to be controlled systematically and to be varied within wide limits, high and/or uniform degrees of hydrophobicization being possible, which is a prerequisite for many applications. The process for the prehydrophobicization permits hydrophobicization of the filler in such a way that it is thereby possible, by means of simple blending of the hydrophobicized filler with organopolysiloxane, followed by kneading of the blend, to produce so-called matrices for crosslinkable organopolysiloxane compositions. The use of previously hydrophobicized filler results in a distinct increase in capacity of the mixing means. Emissions are confined to a central plant, i.e. the hydrophobicization plant, and as a result can be kept under control more easily. The consumption of hydrophobicization agent can be significantly reduced, compared with the in-situ process. The filler content of the compositions can subsequently easily be corrected, optionally, by the addition of further filler.

In discontinuous kneaders such as divided- trough kneaders, compositions comprising organopolysiloxanes and hydrophobic oxidic reinforcing fillers (=matrices) having high storage stability can be produced, vulcanized silicone rubbers produced on the basis of which have very good mechanical characteristics.

The discontinuous kneaders do, however, require very long batch run times of up to 25 h. Owing to the low resulting space-time yield, the preparation of the compositions is very cost-intensive.

The kneaders are tilted after the kneading process is finished, in order to discharge the compositions from the kneaders. Since the high-viscosity compositions, will not, in their entirety, flow out from the kneaders, it is necessary for the process to be assisted manually and for the kneaders to be scraped out. The kneaders operate under an inert atmosphere, since gases may collect in the gas space, which in the presence of oxygen may form explosive mixtures. Furthermore, the kneading process cannot be controlled, since only after kneading of the composition is it possible to ascertain whether the product quality meets the specification. In the event of any deviation from the specification, the entire batch has to be reworked.

BRIEF SUMMARY OF THE INVENTION

The present invention relates to a process for preparing storage-stable organopolysiloxane compositions in which organopolysiloxanes and prehydrophobicized oxidic reinforcing fillers are blended and kneaded in a kneading machine comprising kneading chambers which are arranged in series next to one another.

BRIEF DESCRIPTION OF THE DRAWING

A kneading machine is sketched in FIG. 1, as a sectional view in the kneading chamber region:

The kneading machine 1 has six kneading chambers 2 which are arranged in series next to one another, each contain two axially parallel kneading tools 3 and communicate with one another via openings 5 through which passage is possible transversely to the axes 4 of the kneading tools. The first kneading chamber 2 has a charging port 6 for solids and the final kneading chamber 2 has a discharge port 7. The final kneading chamber 2 has pumping blades 8 for the discharge of product Between the second and third kneading chamber 2, and between the fourth and fifth kneading chamber 2, screens 9 are positioned. In addition to the charging port 6 of the first kneading chamber 2, further charging ports 6 are present which lead into an individual kneading chamber 2 or are located between two kneading chambers 2.

DETAILED DESCRIPTION OF THE INVENTION

Figure 1:
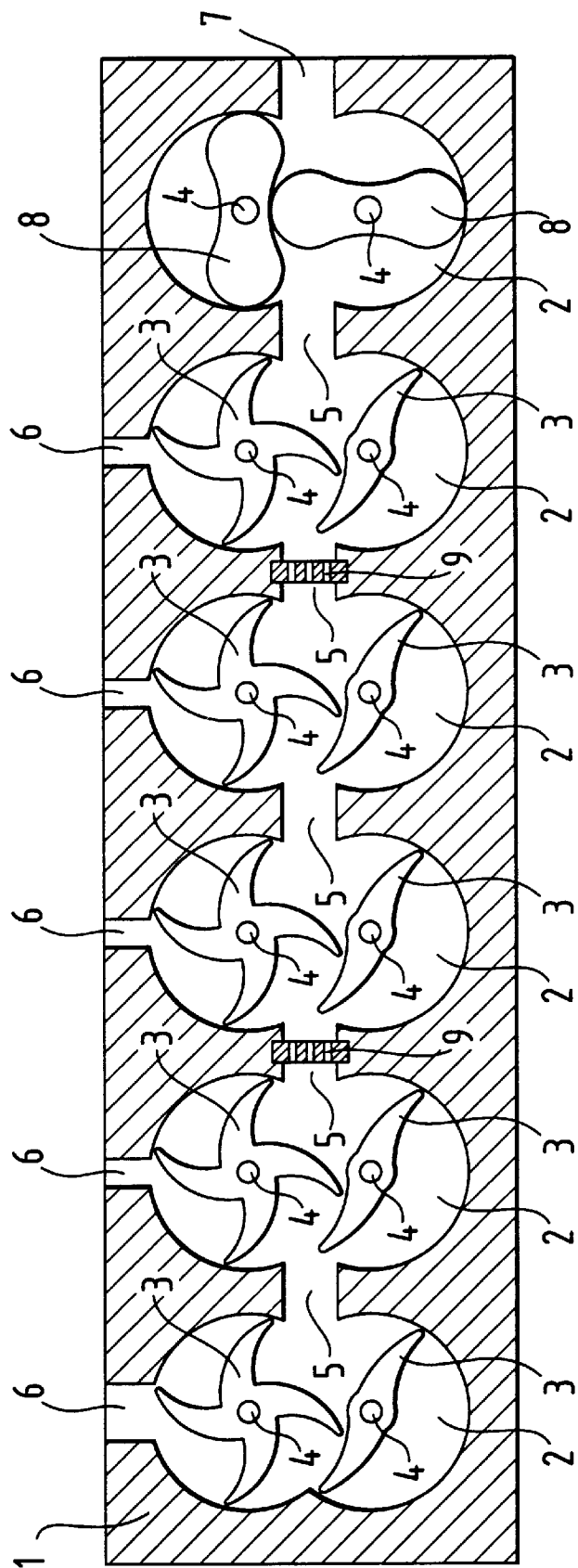

It is an object of the present invention to provide a process for preparing a composition comprising organopolysiloxane and hydrophobic oxidic reinforcing filler, in the course of which process high space-time yields are achieved and the compositions can be kneaded intensively, while the kneading process can be controlled effectively.

The invention relates to a process for preparing organopolysiloxane compositions, which comprises blending and kneading of (1) organopolysiloxanes having, on average per molecule, at least two radicals bound to silicon, said radicals being selected from
  (a) hydrocarbon radicals containing aliphatic carbon-carbon multiple bonds
  (b) hydrogen atoms and
  (c) hydroxyl groups and
(2) prehydrophobicized oxidic reinforcing fillers having a carbon content, obtained by hydrophobicization, of at least 0.5% by weight in a kneading machine having at least two kneading chambers which are arranged in series next to one another, each contain two axially parallel kneading tools drivable so as to corotate or counterrotate, and communicate with one another via openings through which passage is possible transversely to the axes of the kneading tools, the first kneading chamber having a charging port and the final kneading chamber having a discharge port The organopolysiloxanes (1) used are linear or branched organopolysiloxanes comprising units of the formula I

  (I)

in which
  $R^1$ represents univalent $C_1$ to $C_{10}$ hydrocarbon radicals which may or may not be substituted by halogen atoms and are free from aliphatic carbon-carbon multiple bonds,
  $R^2$ represents hydrogen atoms, hydroxyl groups or univalent hydrocarbon radicals containing an aliphatic carbon-carbon multiple bond with from 2 to 8 carbon atoms per radical,
  a represents the values 0,1, 2 or 3 and
  b represents the values 0, 1 or 2,
with the proviso that on average at least two radicals $R^2$ per molecule are present.

The organopolysiloxanes (1) have an average viscosity of at least 10, in particular at least 1000 mPa.s and preferably at most $10^8$, in particular at most $10^5$ mPa.s at 25° C.

Examples of unsubstituted hydrocarbon radicals $R^1$ are $C_1$- to $C_{10}$-alkyl, $C_1$- to $C_{10}$-alkaryl or $C_1$- to $C_{10}$-aralkyl radicals, whose allkyl moiety is saturated, or $C_1$- to $C_{10}$-aryl radicals. Examples of alkyl radicals $R^1$ are the methyl, ethyl, n-propyl, isopropyl, n-butyl, isobutyl, t-butyl, n-pentyl, isopentyl, neopentyl, t-pentyl radical; hexyl radicals such as the n-hexyl and cyclohexyl radical; heptyl radicals such as the n-heptyl radical; octyl radicals such as the n-octyl radical and isooctyl radicals, such as the 2,2,4-trimethylpentyl radical; nonyl radicals such as the n-nonyl radical; decyl radicals such as the n-decyl radical; cycloalkyl radicals such as the cyclohexyl radical; examples of alkaryl radicals $R^1$ are the α- and β-phenylethyl radical; examples of aralkyl radicals $R^1$ are the benzyl radical and the 2,4-diethylbenzyl radical; examples of aryl radicals $R^1$ are the phenyl radical and the naphthyl radical. Preferably, $R^1$ represents $C_1$- to $C_6$-alkyl radicals and phenyl radicals, in particular methyl and ethyl radicals.

Examples of hydrocarbon radicals $R^1$ substituted by halogen atoms are the 3,3,3-trifluoro-n-propyl radical, the 2,2,2,2',2',2'-hexafluoroisopropyl radical, the heptafluoroisopropyl radical, the 3-chloro-n-propyl radical, the 2-ethylbromide radical and the 3-propylbromide radical. Preferably, the radicals $R^1$ are unsubstituted.

Examples of univalent hydrocarbon radicals containing an aliphatic carbon-carbon multiple bond with from 2 to 8 carbon atoms per radical $R^2$ are alkenyl radicals such as the vinyl, 5-hexenyl, 1-propenyl, allyl, 1-butenyl and 1-pentenyl radical; and alkynyl radicals such as the ethynyl, propargyl and 1-propynyl radical.

The organopolysiloxanes (1) contain at least 90, in particular at least 95, mol % of units of formula I, in which the sum a+b =2.

The organopolysiloxanes (1) contain at least 60, preferably at least 80, more preferably at least 95 mol % of units of formula I, in which b has the value 0.

For purposes of the invention, a single organopolysiloxane or mixture of organopolysiloxane compositions can be used.

Preferably, per 100 parts by weight of the organopolysiloxanes (1) at least 5, preferably at least 10, in particular at least 20 parts by weight and at most 200, preferably at most 150, in particular at most 100 parts by weight of prehydrophobicized oxidic stiffening fillers (2) are used.

The fillers (2) are prehydrophobicized pulverulent fillers such as fumed silicic acid, precipitated silicic acid and silicon-aluminum mixed oxides or fibrous fillers such as asbestos. It is possible to use one type of filler, it is also possible to use a mixture of at least two fillers.

The carbon content, obtained by the hydrophobicization of the fillers (2), is at least 1% by weight and preferably at most 6% by weight. When the carbon content of the fillers (2) is determined, care is taken to ensure, by drying for at least 2 hours at at least 200° C., that the measured carbon content relates to the hydrophobicizing layer of the fillers (2).

Preference as reinforcing fillers (2) is given to fumed silicic acid and precipitated silicic acid. Preferably, the BET area of the fillers (2) is at least 50 $m^2/g$, in particular at least 100 $m^2/g$, especially at least 150 $m^2/g$.

The fillers (2) have been hydrophobicized by treatment with, for example, organosilanes, organosilazanes or organosiloxanes or by etherification of hydroxyl groups to alkoxy groups. A preferred process for hydrophobicization is described in U.S. Pat. No. 5,057,151.

For purposes of the invention a single prehydrophobicized oxidic reinforcing filler or a mixture of reinforcing fillers can be used.

The organopolysiloxanes (1a) which contain hydrocarbon radicals with aliphatic carbon-carbon multiple bonds contain, on average, from 2 to 10, preferably from 2 to 4 aliphatic carbon-carbon multiple bonds per molecule. The terminal units of formula I contain aliphatic carbon-carbon multiple bonds. The aliphatic carbon-carbon multiple bonds are double bonds. The organopolysiloxanes (1a) have an average viscosity of at least 100, in particular at least 1000 mPa.s, and preferably at most $10^5$, in particular at most $5 \times 10^4$ mPa.s at 25° C.

The organopolysiloxanes (1b) with Si-bound hydrogen atoms contain, on average, from 2 to 50, preferably from 5 to 20 Si-bound hydrogen atoms per molecule. The organopolysiloxanes (1b) have an average viscosity of at least 10, preferably at least 30 mPa.s, and at most $10^6$, preferably at most 10000 mPa.s at 25° C.

The organopolysiloxanes (1c) which contain Si-bound hydroxyl groups have from 2 to 4 hydroxyl groups per molecule. Preferably they contain terminal hydroxyl groups. The organopolysiloxanes (1c) have an average viscosity of at least 10, in particular at least 1000 mPa.s, and preferably at most $10^8$, in particular at most $5 \times 10^6$ mPa.s at 25° C.

The mean residence time of the composition in the kneading machine is at most one hour, preferably at most 30 min.

If, according to the invention, a kneading machine having a net volume of 100 l is used, it is possible to prepare without difficulty, with a mean residence time of from 15 to 20 min, 200 kg/h of organopolysiloxane composition, i.e. approximately 4000 kg/day.

Comparable 3000 kg of storage-stable organopolysiloxane compositions are obtained if the operation uses a discontinuous tilting kneader having a net volume of 4000 l at a mean residence time of 20 h. In the case of the tilting kneader it is necessary to take into account additional time for emptying and, optionally, cleaning.

The organopolysiloxane compositions which contain prehydrophobicized oxidic reinforcing fillers (2) have particularly good storage stability if, in a first step, only a portion of the organopolysiloxanes (1) is blended with the fillers (2), the blend is kneaded in a second step at a temperature of preferably 130° C. until the viscosity of the blend has reached a constant value, and in a third step the blend is blended with the remainder of the organopolysiloxanes (1). In the first step from 30% to 80% by weight of the organopolysiloxanes (1) are used.

The process version subdivided into three steps can be carried out in a kneading machine which has at least three kneading chambers, the kneading chambers used for the third step having at least one additional charging port The remainder of the organopolysiloxanes (1) is introduced, in the third step, into at least two, preferably three kneading chambers, less organopolysiloxanes (1) being added in the first kneading chamber of the third step than in the further kneading chambers. Introducing the organopolysiloxanes (1) in the third step into a plurality of kneading chambers results in a homogeneous organopolysiloxane composition.

The kneading machine used according to the invention permits control of the intensity of the kneading process and of the residence time, since rotational speed and sense of rotation of the kneading tools in the individual kneading chambers can be adjusted at will independently of one another. For example, the rotational speeds in the pilot plant may be from 1 to 400 rpm.

Given a suitable choice of the mixing and kneading tools, even higher rotational speeds are possible.

In the case of the process version subdivided into three steps, the kneading tools of the kneading chambers can, in the first and the second step, be operated at lower rotational speed than in the third step. For example, the rotational speeds in the third step are twice to five times as high in the first and second step. If the first step is performed in a plurality of kneading chambers, it is possible, preferably, for the kneading tools to be operated in the opposite direction in one of the kneading chambers. As a result, the degree of filling of the kneading machine and consequently the residence time are improved.

Since no free gas space is present in the kneading machine, inert gas can be dispensed with.

The discharge of product from the kneading machine does not present a problem, since the finished compositions can easily be conveyed to the discharge port by the kneading tools. The final kneading chamber preferably has pumping blades for discharging the product.

The kneading machine has at least three, in particular at least five kneading chambers.

Between individual kneading chambers or all the kneading chambers screens, baffles or sliders can be positioned to hold back the organopolysiloxane compositions. These elements may be adjustable in terms of their position and the passage aperture they can unblock. Thus the residence time in the individual chambers can be varied.

Preferably, the kneading tools are kneading blades, rollers or polygonal disks.

The kneading machine comprises, in addition to the charging port of the first kneading chamber, further charging ports which lead into the individual kneading chambers or are situated between two kneading chambers. Each kneading chamber has one charging port. The charging port of the first kneading chamber is suitable for charging with solids, and the other charging ports are designed for metering in liquids. Each kneading chamber has a separately controllable drive which has a torque-measuring arrangement The torque is a measure for the viscosity of the blend in the chamber.

The kneading chambers can be heated or cooled, and can, in particular, be operated individually at different temperatures. Kneading produces frictional heat which is removed in part by cooling, in order to avoid overheating of the composition. The temperature during kneading, of the process version subdivided into three steps, is at most 150° C. in the second step.

The kneading tools are overhung. The casing end wall on the bearing side is provided with openings for the drive shafts of the kneading tools. The casing of the kneading chambers has a joint running transversely to the tool axes, so that the casing section facing away from the mounting can be moved away from the joint and the kneading tools in the axial direction of the drive shafts. A kneading machine of this design is particularly easy to clean.

Such a kneading machine is described in DE-C40 05 823.

The organopolysiloxane compositions are storage-stable and are suitable, in particular, as matrices for the production of high-quality condensation-crosslinking, peroxide-crosslinking and addition-crosslinking organopolysiloxane rubber compositions, in particular of two-pack compositions.

To produce condensation-crosslinking organopolysiloxane rubber compositions, the organopolysiloxane compositions prepared according to the invention are admixed with additives such as pigment pastes, plasticizers etc. Special curing agents can be used to make vulcanized materials from these. To produce addition-crosslinking organopolysiloxane rubber compositions, the organopolysiloxane compositions prepared according to the invention for component A are admixed with noble-metal catalysts and, optionally, inhibitors, and for component B with methylhydrogensiloxane crosslinkers and, if required, further additives such as pigment pastes, stabilizers etc.

In the following Examples, unless otherwise stated, a) all quantities are based on weight;

b) all pressures are 0.10 MPa (abs.);

c) all temperatures are 20° C.

EXAMPLE 1

Continuous production of a matrix for addition-crosslinking liquid-rubber products On a Conterna® kneading machine from IKA-Maschinenbau Janke & Kunkel GmbH & Co.KG, Staufen, comprising 12 chambers having a volume of 10 liters each, 80 kg/h of polydimethylsiloxane having terminal vinyl groups, with a viscosity of 20000 mPa.s and 60 kg/h of a prehydrophobicized filler having a BET area of 300 $m^2/g$ (Wacker® HDK SKS 300) are metered into the first chamber. The composition, which is compacted from chamber 2 onwards is kneaded with cooling at rotational speeds of from 50 to 70 rpm in the chambers 2 to 8. In the process the temperature nevertheless increases to about 100° C. Into each of the chambers 9, 10 and 11 polydimethylsiloxane having terminal vinyl groups with a viscosity of 20000 mPa.s is metered, the throughput being

| | |
|---|---|
| chamber 9 | 5 kg/h |
| chamber 10 | 15 kg/h |
| chamber 11 | 40 kg/h. |

The rotational speeds of the kneading tools in chambers 9 to 11 are about 200 rpm. Chamber 12 is fitted with pumping blades which convey the product into a devolatilizing vessel. The residence time of the matrix in the kneading machine is about 15 min. The devolatilizing vessel is purged with about 5 m³/h of $N_2$ at a negative pressure of about 200 mbar, to entrain small amounts of volatile siloxanes into a waste gas purification system. The matrix is discharged from the devolatilizing vessel by means of a pump via a strainer unit into a storage vessel.

The tests on the matrix gave the following values:

| | Measured | Specification |
|---|---|---|
| Viscosity | 1300 Pas | 1100–1500 Pas |
| Transparency | good | good |
| Appearance | no nodules | no nodules |
| Storage stability* | 20% | <50% |

*The storage stability test involves storing 200 g of the matrix in a glass bottle for 16 h at 150° C. and measuring the viscosity before and after storage. The increase in viscosity must not exceed 50%.

EXAMPLE 2
Comparative Experiment

Continuous production of a matrix for addition-crosslinking liquid-rubber products on a twin-shaft extruder:

Into a twin-shaft extruder having an overall length of 36 D and a screw diameter of 40 mm, 20 kg/h of polydimethylsiloxane having a viscosity of 20000 mPa.s and 15 kg/h of Wacker® HDK SKS 300 were metered. At an overall length of 25 D, a further 15 kg/h of polymer having terminal vinyl groups and a viscosity of 20000 mPa.s were introduced. Downstream of a short evacuation zone at approximately 32 D the product was discharged via a strainer. The residence time was about 2 min, the temperature rose to 150° C.

| Result: | |
|---|---|
| Viscosity | 1800 Pas |
| Transparency | good |
| Appearance | contained a few nodules |
| Storage stability | >>100% (viscosity no longer measurable) |

What is claimed is:

1. A process for preparing organopolysiloxane compositions, which comprises blending and kneading of
    (1) organopolysiloxanes having, on average per molecule, at least two radicals bound to silicon, selected from the group consisting of,
        (a) hydrocarbon radicals containing aliphatic carbon-carbon multiple bonds,
        (b) hydrogen atoms and
        (c) hydroxyl groups, and
    (2) prehydrophobicized oxidic reinforcing fillers having a carbon content of at least 0.5% by weight, in a kneading machine having at least two kneading chambers which are arranged in series next to one another, each having two axially parallel kneading tools drivable so as to corotate or counterrotate, and communicate with one another via openings through which passage is possible transversely to the axes of the kneading tools, the first kneading chamber having a charging port and the final kneading chamber having a discharge port.

2. The process as claimed in claim 1, wherein the organopolysiloxanes are linear or branched organopolysiloxanes comprising units of the formula

in which
    $R^1$ is a monovalent $C_1$ to $C_{10}$ optionally halogenated hydrocarbon radical free of aliphatic unsaturation,
    $R^2$ is a hydrogen atom, hydroxyl group or aliphatically unsaturated, monovalent hydrocarbon radical having from 2 to 8 carbon atoms,
    a represents the values 0, 1, 2 or 3 and
    b represents the values 0, 1 or 2,
with the proviso that on average at least two radicals $R^2$ per molecule are present.

3. The process as claimed in claim 1, wherein the organopolysiloxanes (1) have an average viscosity of at least 10 and at most $10^8$ mPa.s at 25° C.

4. The process as claimed in claim 2, wherein the organopolysiloxanes (1) contain at least 90 mol % of units of formula I, in which the sum a+b=2.

5. The process as claimed in claim 3, wherein the organopolysiloxanes (1) contain at least 80 mol % of units of formula I, in which b has the value 0.

6. The process as claimed in claim 1, wherein from 5 to 200 parts by weight of prehydrophobicized oxidic reinforcing fillers is present per 100 parts by weight organopolysiloxanes (1).

7. The process as claimed in claim 1, wherein the reinforcing filler (2) is fumed silicic acid or precipitated silicic acid having a BET area of at least 50 m²/g.

8. The process as claimed in claim 1, wherein, in a first step, a portion of the organopolysiloxanes (1) is blended with the fillers (2), the blend is kneaded in a second step until the viscosity has reached a constant value, and in a third step the blend is blended with the remainder of the organopolysiloxanes (1).

9. The process as claimed in claim 1, wherein the kneading chambers can be heated or cooled.

10. A process for preparing organopolysiloxane compositions, said process comprising:
    providing a kneading machine containing at least two kneading chambers which are arranged in series next to one another, each chamber having two axially parallel kneading tools drivable so as to corotate or counterrotate, each chamber communicating with one another via openings through which passage is possible transversely to the axes of the kneading tools, the first kneading chamber having a charging port and the final kneading chamber having a discharge port;
    placing in the chambers of the kneading machine an organopolysiloxane composition comprising:
        (1) one or more organopolysiloxane having, on average per molecule, at least two radicals bound to silicon, selected from the group consisting of:
            (a) hydrocarbon radicals containing aliphatic carbon-carbon multiple bonds,
            (b) hydrogen atoms,
            (c) hydroxyl groups, and
            (d) mixtures thereof, and
        (2) prehydrophobicized oxidic reinforcing fillers having a carbon content of at least 0.5% by weight;
    operating the kneading tools in the chambers to blend and knead the organopolysiloxane and the prehydrophobicized oxidic reinforcing fillers in the chambers of the kneading machine.

11. The process as claimed in claim 10, wherein the kneading chambers can be heated or cooled.

12. The process as claimed in claim 10, wherein within at least one chamber, kneading is continued until a constant viscosity is reached.

13. The process claimed in claim 10, wherein the residence time of the organopolysiloxane and the fillers are different in at least two of the chambers.

14. The process as claimed in claim 10, wherein in a first step, a portion of the organopolysiloxane (1) is blended with the fillers (2), the blend is kneaded in a second step until the viscosity has reached a constant value, and in a third step the blend is blended with the remainder of the organopolysiloxane (1).

15. The process as claimed in claim 14, wherein the kneading tools in said third step are operated at a rotational speed different from that in said first and second steps.

16. A process for preparing a blended organopolysiloxane composition, said process comprising:
providing organosiloxane composition ingredients comprising:
(1) one or more organopolysiloxanes having, on average per molecule, at least two radicals bound to silicon, said radicals selected from the group consisting of:
(a) hydrocarbon radicals containing aliphatic carbon-carbon multiple bonds,
(b) hydrogen atoms,
(c) hydroxyl groups, and
(d) mixtures thereof, and
(2) prehydrophobicized oxidic reinforcing fillers having a carbon content of at least 0.5% by weight;
providing a kneading machine having a first kneading chamber, a further kneading chamber and a final pumping chamber, each of the chambers containing two axially parallel kneading tools drivable so as to corotate or counterrotate, each chamber communicating with one another via openings through which passage is possible transversely to the axes of the kneading tools, the first kneading chamber having a charging port and the pumping chamber having a discharge port;
introducing organopolysiloxane and fillers through the charging port into the first kneading chamber and kneading to form an organopolysiloxane composition;
transferring at least a portion of said organopolysiloxane composition from the first kneading chamber to the further kneading chamber through the opening communicating the first kneading chamber with the further kneading chamber, and kneading said organopolysiloxane composition in the further kneading chamber;
transferring at least a portion of the organopolysiloxane composition from the further chamber to the pumping chamber through the opening communicating the further kneading chamber and the pumping chamber;
recovering said blended organosiloxane composition from the pumping chamber through the discharge port.

17. The process of claim 16, wherein a portion of the total organopolysiloxane content of the composition is added to a further kneading chamber.

18. The process of claim 16, wherein within at least one chamber, kneading is continued until a constant viscosity is reached.

19. The process of claim 16, wherein the kneading machine further includes a plurality of kneading chambers between the further kneading chamber and the pumping chamber, and said process further comprises kneading said organopolysiloxane composition in each of said plurality of kneading chambers.

20. The process of claim 16, wherein in a first step, a portion of the organopolysiloxane (1) is blended with the fillers (2), the blend is kneaded in a second step until the viscosity has reached a constant value, and in a third step the blend is blended with the remainder of the organopolysiloxane (1), wherein in said third step, the remainder of the organopolysiloxane is introduced into at least two different chambers in differing amounts.

* * * * *